July 6, 1943.                P. F. SPERRY                 2,323,576
                         CAMERA CONTROL MEANS
                        Filed Nov. 17, 1941          4 Sheets-Sheet 1

INVENTOR.
Philmore F. Sperry

July 6, 1943.  P. F. SPERRY  2,323,576
CAMERA CONTROL MEANS
Filed Nov. 17, 1941    4 Sheets-Sheet 2
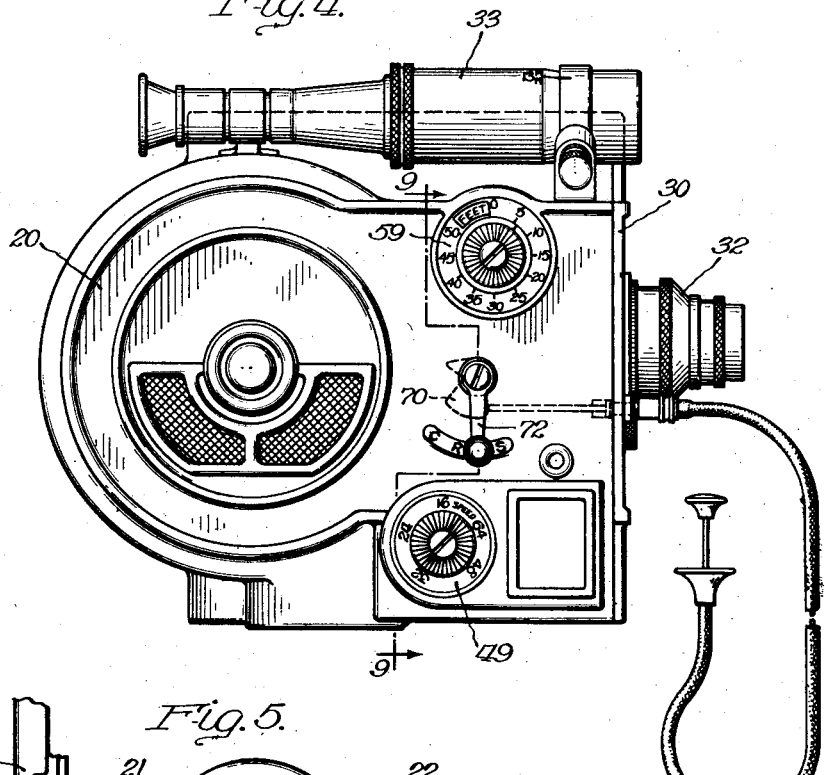
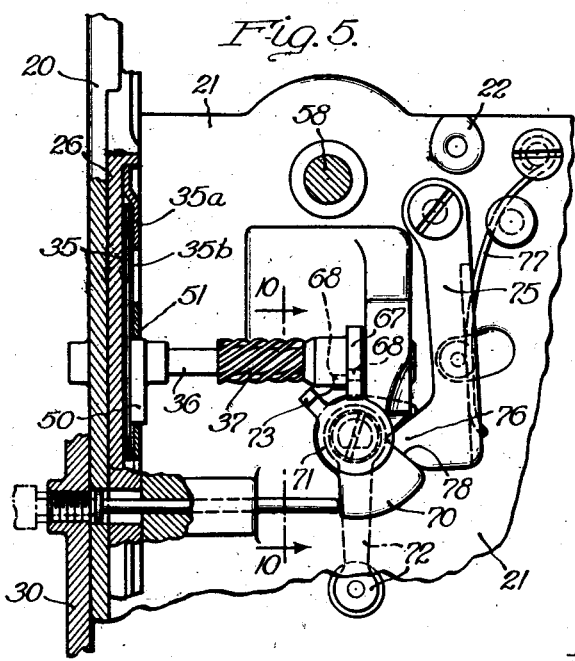
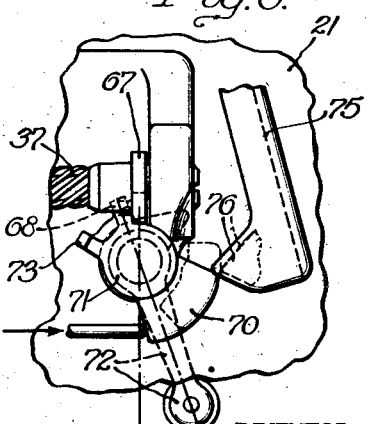
INVENTOR.
Philmore F. Sperry

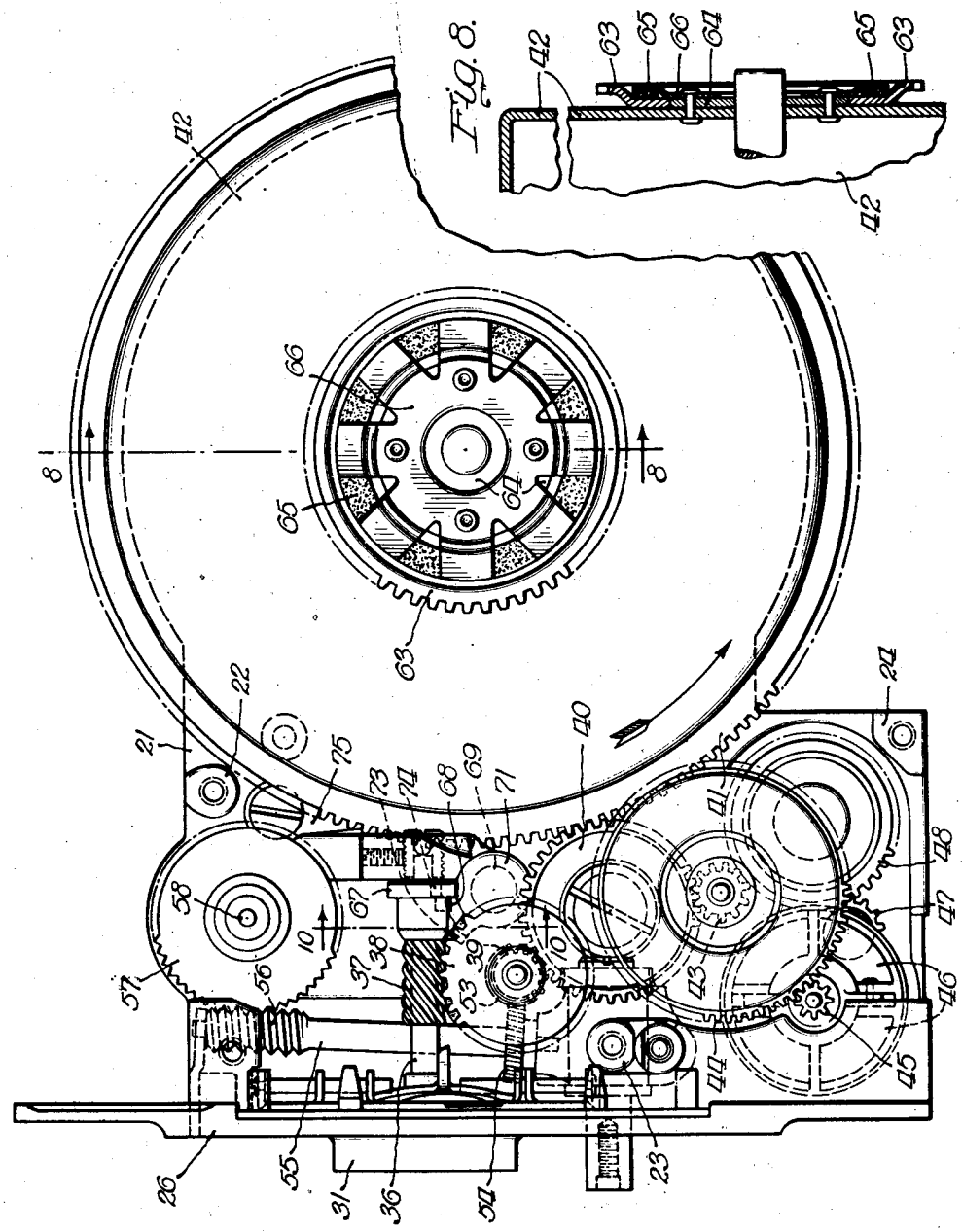

July 6, 1943.  P. F. SPERRY  2,323,576
CAMERA CONTROL MEANS
Filed Nov. 17, 1941  4 Sheets-Sheet 4
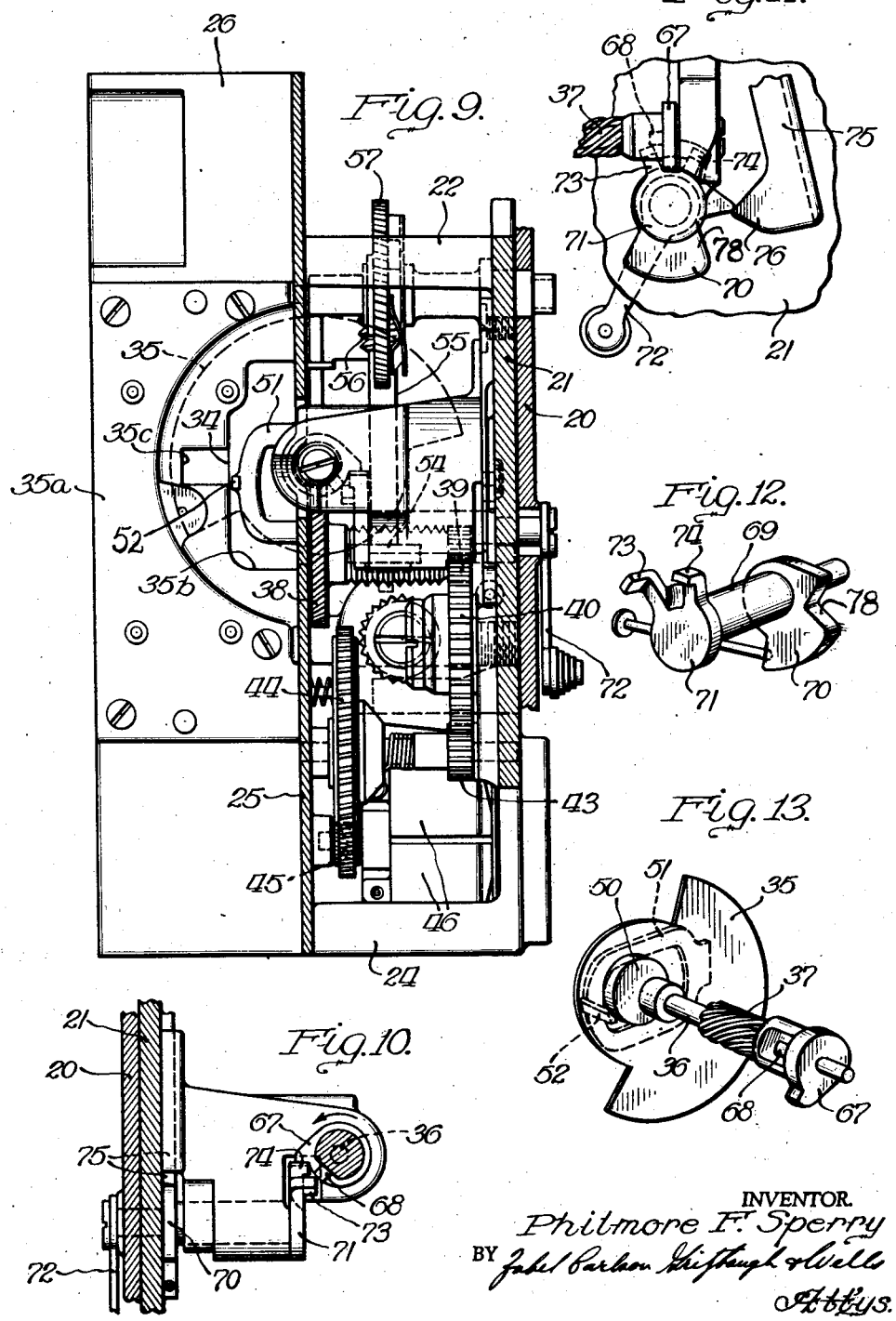
INVENTOR.
Philmore F. Sperry
BY
Attys.

Patented July 6, 1943

2,323,576

UNITED STATES PATENT OFFICE 2,323,576

CAMERA CONTROL MEANS

Philmore F. Sperry, Chicago, Ill.; Helen B. Sperry, executrix of the estate of said Sperry, deceased, assignor, by mesne assignments, to Theodore H. Briskin, Philip F. Briskin, and Jack Briskin Application November 17, 1941, Serial No. 419,457

14 Claims. (Cl. 88—17)

This invention relates to camera control means and it has for its object the provision of improved means for controlling the operation of a camera and particularly for controlling the operation of a camera of the magazine type, whereby a control lever or other part may be set for holding the camera against operation, or may be set for causing the camera to operate continuously so long as the control lever is held manually in critical position, or may be set in an alternative position for holding the control lever in critical position and for causing the camera to operate continuously while the control lever is so held, or may be set in still a different position so as to cause the camera to operate for a single frame exposure.

In the preferred embodiment of the invention, the control means comprises a lever which is moved to the limit of its motion in one direction for causing the camera to run continuously, the arrangement being such that the lever is held at its limit position until it is brought back manually. Alternatively, the lever is moved in the same direction to an intermediate point for causing the camera to run as long as the lever is held manually in such intermediate position, means being provided in connection with the lever for causing it to return to its neutral position for stopping the operation of the camera whenever the lever is released. The lever is also adapted to be moved in the opposite direction whereupon the camera operates for a single exposure and then stops, it being necessary to bring the lever back to the neutral position and give it another stroke for a successive single exposure operation, means being provided preferably for automatically bringing the lever back under these circumstances to the neutral position when released.

It is another object of the invention to improve devices of this type in sundry details hereinafter pointed out. The preferred means by which the several objects have been attained are illustrated in the accompanying drawings, in which—

Fig. 4 is a face view of the camera as seen from the opposite side as compared with Fig. 1;

Fig. 5 is a view on an enlarged scale showing the shuttle supporting and driving shaft and some of the control means therefor, the view being taken at the front portion of the camera looking toward the right in Fig. 9, with the major portion of the principal housing member and the partition frame plate of the camera removed;

Fig. 6 is a view similar to a portion of Fig. 5 but with certain of the parts in changed position;

Fig. 7 is a side view of the corresponding parts of the camera as seen from the left in Fig. 9, with the principal housing member of the camera and the magazine carrier and the partition frame plate all removed, and with a portion at the rear of the camera broken away;

Fig. 8 is a vertical sectional view taken substantially at the line 8—8 of Fig. 7;

Fig. 9 is a vertical sectional view taken on an enlarged scale substantially at the line 9—9 of Fig. 4, but with the major portion of the principal housing member of the camera and the magazine carrier removed;

Fig. 10 is a vertical sectional view taken substantially at the line 10—10 of Figs. 5 and 7;

Fig. 11 is a view similar to a portion of Figs. 5 and 6 but with certain of the parts in changed position;

Fig. 12 is a perspective view of the control shaft and related parts of the camera; and Fig. 13 is a perspective view of the shuttle driving shaft and parts related thereto.

Figure 2:
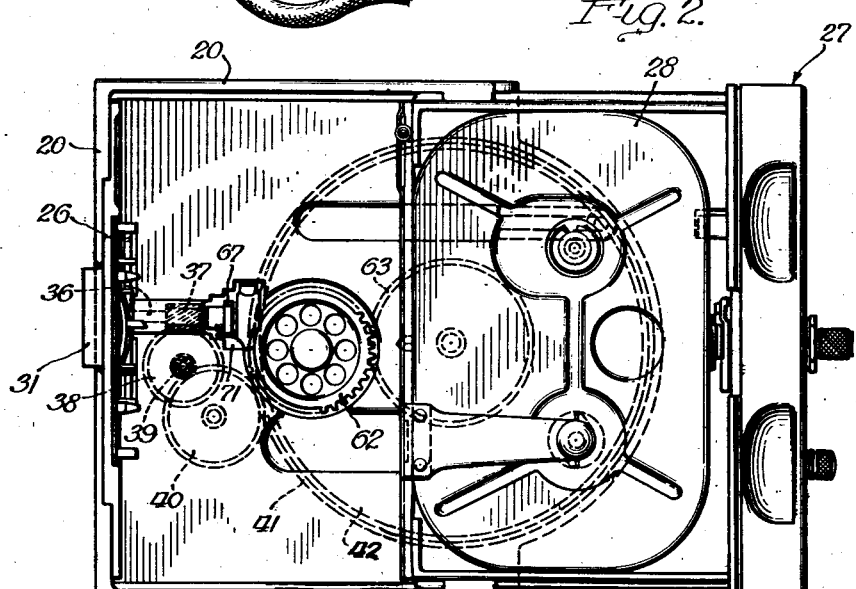
Fig. 2 is a view similar to Fig. 1 but with the side plate and the front facing plate and the view finder all removed, and with the magazine carrier moved to its open position.

Referring now to the several figures of the drawings, in which corresponding parts are indicated by the same reference characters, 20 indicates a casing member in the form of a cup constituting the principal frame member of the camera. At the side of the camera at the right in Fig. 9, a heavy frame plate 21 is provided, having lugs 22, 23 and 24 formed integrally therewith and extending transversely for supporting a partition frame plate 25 at about the middle point of the camera transversely. Secured to the frame plates 21 and 25 at the front of the camera, there is a front frame plate 26. At the left side of the camera as shown in Fig. 9, a magazine carrier 27 in the form of a drawer is provided, being slidably mounted so as to be movable from a retracted position as shown in Fig. 2 to a position at the front of the camera where it holds a film magazine 28 in operative position. A removable side plate 29 is mounted in position so as to form an outside closure for the drawer 27 when the drawer is in its forward operative position. A front facing plate 30 is also removably mounted in position in front of the front frame plate 26 and the front flange portion of the casing member 20.

Figure 1:
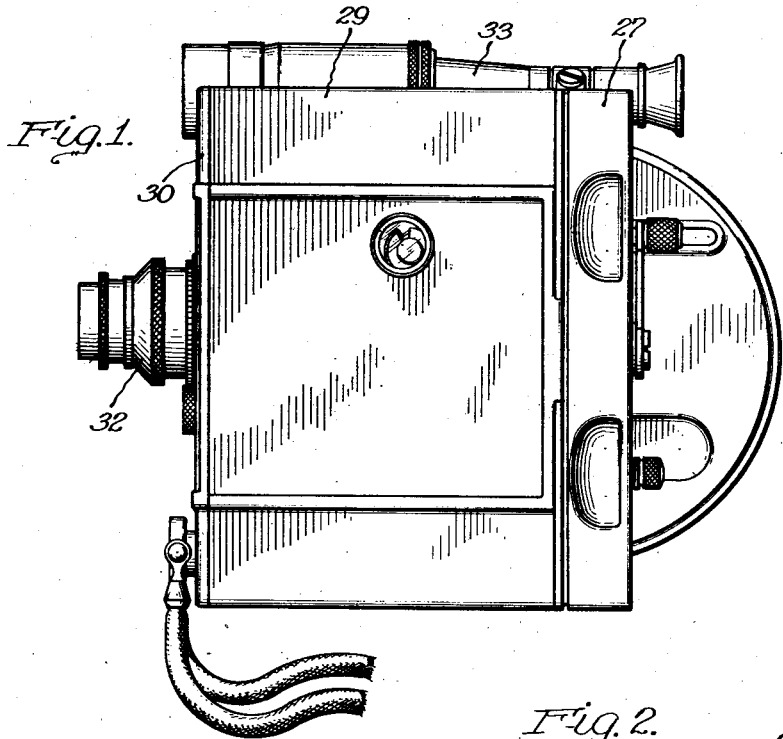
Fig. 1 is a side face view of a camera embodying the invention.

As is best shown in Fig. 7, the front frame plate 26 is provided with a forwardly extending sleeve portion 31 for removably supporting a lens structure 32 of the camera at a suitable distance in front of the film contained in the film magazine 28 for a proper exposure so as to insure a clear-cut image on the film. A view finder 33 of any suitable type is adjustably mounted on top of the camera at one side thereof as shown in Figs. 1 and 4.

The front frame plate 26 is provided at its left side portion as shown in Fig. 9 with an exposure opening 34 in centered position with respect to the sleeve 31. A shutter 35 is rotatably mounted in position for effectively closing such opening 34 intermittently, such shutter 35 being fixedly mounted upon the front end portion of a drive shaft 36 which is journaled at its front end in said front frame plate 26. At its intermediate portion, the shaft 36 is provided with a worm 37 which is driven by a worm gear 38 (see Fig. 7) which in turn is driven by a pinion 39 and a gear 40 which meshes with a large gear 41 fixedly mounted on the housing 42 of a spring motor mounted in the rear portion of the camera casing at the right as shown in Fig. 9. The gear 40 (see Fig. 7) also meshes with a pinion 43 which is connected with a gear 44 meshing with a pinion 45 connected with a governor of any suitable type comprising weights 46.

Control means of any suitable type in the form of a brake is provided in connection with the governor for regulating the speed at which the pinion 45 and its connected parts may be driven, such control means comprising a pinion 47 meshing with a gear 48 which is adjustable manually by means of a head 49 rotatably mounted on the outer face of the camera casing as shown in Fig. 4. The governor and control means form in and of themselves no part of the present invention.

In the arrangement shown, a sheet metal plate 35a is mounted in position at the rear face of the shutter 35, such plate 35a being provided with a large opening 35b comprising a portion 35c corresponding to the exposure opening 34 in the front frame plate 26.

On the front end portion of the shaft 36 immediately to the rear of the shutter 35, an eccentric 50 is fixedly mounted so as to rotate with the shaft for actuating a shuttle 51 for causing it to move upwardly and downwardly for enabling a claw 52 thereon to actuate the film in the magazine 28, as is readily understood in devices of this type. In the arrangement shown, the shuttle 51 is slidably mounted on the rear face of the plate 35a so as to move vertically thereon, the eccentric 50 being located in the opening 35b of the plate 35a.

For driving a footage indicator for showing the length of the film unused within the magazine 28, a pinion 53 is provided rotatable rigidly with the gear 38 so as to drive a pinion 54 meshing therewith for rotating a shaft 55 provided on its upper end portion with a worm 56 for driving a worm gear 57 mounted upon a shaft 58 which extends outwardly through the wall of the camera casing, having a head or dial 59 mounted thereon at the outer face of the casing as shown in Fig. 4. This footage mechanism also forms no part of the present invention.

Figure 3:
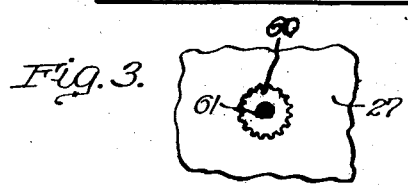
Fig. 3 is a face view of a fragmentary portion of the vertical wall of the carrier against which a magazine is positioned.

Means is provided for driving the rewinding reel of the film magazine 28 frictionally by power from the spring motor. This means comprises a pinion 60 mounted on the outer wall of the drawer 27, as shown in Fig. 3, such pinion being mounted by means of a shaft 61 which in the operative arrangement of the parts is operatively connected with the lower reel of the magazine for rotating such reel for rewinding the film thereon. The arrangement of the parts in the magazine by which the pinion 60 and shaft 61 are enabled to drive the rewinding reel form no part of this invention. For actuating the pinion 60 and shaft 61, a gear 62 is rotatably mounted on the partition frame plate 25 in position to be engaged by the pinion 60, such gear 62 meshing with a gear 63 carried by the motor housing 42, as is best shown in Figs. 7 and 8.

The means for mounting the gear 63 upon the motor housing 42 comprises a round disc 64 fixedly mounted on the wall of the housing 42 so as to support the gear 63 rotatably in position, the gear 63 being in the form of a ring having a working fit about the disc. Next to the gear 63, a washer 65, preferably formed of cork, is loosely mounted, such washer being pressed against the face of the gear by means of a spring plate 66 in the form of a spider, the arms of which engage the outer face of the cork washer 65, the plate 66 being rigidly connected with the housing 42 and the disc 64. The arrangement is such that power is applied frictionally from the housing 42 and the spring 66 through the cork ring 65 to the gear 63. The gear 63 and its cooperating driving train parts are arranged so as normally to drive the rewinding reel at the maximum speed required. As the effective diameter of the rewinding reel increases by reason of the accumulation of the film thereon, the gear 63 slips with respect to the housing 42 so as to insure the film being wound snugly upon the reel without injuring the reel, as is well understood in devices of this type.

The means for controlling the operation of the motor so as to regulate the operation of the camera as desired, comprises mechanism acting upon the main driving shaft 36 which carries the shutter 35 and eccentric 50. This means comprises an arm 67 mounted upon the shaft 36 at its rear end portion, and a bearing part 68 at the front face of the arm 67 and of shorter length radially than the arm 67. Adjacent to the shaft 36, a control member 69 is mounted in the form of a shaft having two plates 70 and 71 mounted thereon at its opposite end portions as best shown in Fig. 12. The shaft 69 in the arrangement shown is mounted at right angles to the shaft 36 (see Fig. 10), having its outer end beyond the arm or plate 70 extending through the wall of the camera casing so as to have a lever 72 fixedly mounted thereon. The plate 71 is provided with two lugs 73 and 74 thereon in position to engage the bearing part 68 and the arm 67, respectively, depending upon the angular position of the shaft 69, for controlling the rotation of the shaft 36. The arrangement is such that when the arm 72 stands in its normal neutral position as shown in Fig. 4, the shorter lug 74 engages the arm 67 (see Fig. 5) so as to hold the shaft 36 against rotation. When the lever 72 is swung a short distance toward the left in Fig. 4 so as to bring the lever opposite to the letter R on the face of the camera, the lug 74 is swung out of engagement with the arm 67 on the shaft 36 so as to permit the shaft 36 to rotate continuously. This arrangement of the parts is illustrated in Fig. 6. When the lever 72 is swung still farther toward the left in Fig. 4 into position opposite to the letter C on the face of the camera, the lug 74 is moved still farther out of engagement with the arm 67 so as to permit the shaft 36 to rotate continuously also in this position. When, on the other hand, the lever 72 is moved toward the right in Fig. 4 so as to stand opposite to the letter S on the face of the camera, under such circumstances the longer lug 73 is moved into position to engage the bearing part 68, as is shown in Fig. 11, so as to limit the rotation of the shaft 36.

Means is provided in connection with the shaft 69 for normally holding the shaft yieldingly in the position as shown in Fig. 5. This means comprises an arm 75 pivotally mounted on the face of the plate 21 a short distance above the shaft 69, such arm 75 being provided at its lower end with a wedge-shaped head portion 76, the side face portions of which are in oblique position with respect to the body of the arm 75. The arm 75 is normally pressed by a spring 77 (see Fig. 5) toward the left in said figure so as to cause the wedge-shaped head 76 to engage a V-shaped notch 78 in the arm or plate 70. The arrangement is such that the spring-pressed arm 75 serves normally by engagement with the notch 78 to hold the shaft 69 yieldingly in its normal neutral position as shown in said Fig. 5. The arrangement is such also that when the lever 72 is swung in either direction a short distance from its neutral position as shown in said Fig. 5, the spring-pressed arm 75 exerts a constant pressure upon the plate 70 for returning it by a camming action to the normal neutral position illustrated in said Fig. 5. When however the arm 72 is swung to the limit of its motion toward the left in Fig. 4 (toward the right in Fig. 6) so as to bring the curved outer end of the arm or plate 70 into position opposite to the wedge-shaped head 76 of the arm 75, under those circumstances the spring-pressed arm 75 presses squarely against the end of the arm or plate 70 and thus has no tendency to cause a return of the shaft 69 to its normal neutral position.

In operation, with the parts in the positions as shown in Fig. 5, the shaft 36 is held against rotation by the engagement of the shorter lug 74 with the stop arm 67. When the lever 72 is moved toward the right in Fig. 4 and released, the shaft 36 is given a single complete rotation at the end of which the movement is stopped by reason of the engagement of the stop part 68 on the shaft with the longer lug 73. The arrangement is such that at the end of the single rotation the spring-pressed arm 75, by the engagement of the obliquely disposed upper face portion of the head 76 with the notch 78 in the plate 70 as shown in Fig. 11, causes the lever 72 to move promptly again to its normal neutral position as shown in said Fig. 5, the lug 73 in such movement being released from the stop part 68, and the lug 74 being again brought into engagement with the stop arm 67. If the lever 72 is swung toward the left in Fig. 4 a short distance to bring the lever into position opposite to the letter R, the lug 74 is thereby moved out of engagement with the stop arm 67 so as to permit the shaft 36 to rotate, such rotation being adapted to continue so long as the lever 72 is held in the position specified. When thereafter the lever 72 is released by the operator the spring-pressed arm 75 by a camming engagement with the notch 78 returns the lever 72 to neutral position. If, on the other hand, the lever 72 be swung to the limit of its motion toward the left in Fig. 4, the lug 74 is thereby released from engagement with the stop arm 67 so as to permit the shaft 36 to run continuously, and the head 76 is brought into engagement with the curved end face of the arm 70 so as to hold the lever 75 against return movement. Under such circumstances, the operation of the camera continues until the lever 72 is returned manually to its normal neutral position.

While the form and arrangement of parts as above described are preferred, the invention is not to be limited thereto except so far as the claims may be so limited, it being understood that changes might well be made in the form and arrangement of the parts without departing from the spirit of the invention.

I claim:

1. In a magazine type of camera and control means therefor, the combination of a camera casing, lens means in operative position thereon, means for mounting a film magazine in said casing so as to hold the film therein in operative relationship to said lens means, a shaft rotatably mounted in said casing, means for driving said shaft, shutter means connected with said shaft so as to be driven thereby for controlling the exposure of the film, means driven by said shaft for advancing the film step by step in timed relation to the operative movements of the shutter means, and means for controlling the rotation of said shaft comprising an adjustable member adapted in one position to hold the shaft from rotation and adapted in either of two changed positions to permit the shaft to run continuously, and yielding means having an operative bearing on said adjustable member adapted normally to return said member to said one position from one of said changed positions but not from the other.

2. In a magazine type of camera and control means therefor, the combination of a camera casing, lens means in operative position thereon, means for mounting a film magazine in said casing so as to hold the film therein in operative relationship to said lens means, a shaft rotatably mounted in said casing, means for driving said shaft, shutter means connected with said shaft so as to be driven thereby for controlling the exposure of the film, means driven by said shaft for advancing the film step by step in timed relation to the operative movements of the shutter means, and means for controlling the rotation of said shaft comprising an adjustable member adapted when in an intermediate neutral position to hold the shaft from rotation and adapted when given a slight movement in either direction from the neutral position to permit the shaft to rotate, and spring-pressed means adapted by a wedging engagement with a part movable with said adjustable member to return the member to neutral position when released after being moved a short distance in either direction from said neutral position.

3. In a magazine type of camera and control means therefor, the combination of a camera casing, lens means in operative position thereon, means for mounting a film magazine in said casing so as to hold the film therein in operative relationship to said lens means, a shaft rotatably mounted in said casing, means for driving said shaft, shutter means connected with said shaft so as to be driven thereby for controlling the exposure of the film, means driven by said shaft for advancing the film step by step in timed relation to the operative movements of the shutter means, and means for controlling the rotation of said shaft comprising an adjustable member adapted when in an intermediate neutral position to hold the shaft from rotation and adapted when given a slight movement in either direction from the neutral position to permit the shaft to rotate, a plate rotatable with said adjustable member and having a V-shaped notch therein, an arm swingingly mounted so as to be movable into and out of wedging engagement with said notch, and spring means bearing on said arm adapted normally to press the arm into engagement with said notch for holding the adjustable member in its neutral position and for returning the member to neutral position when released after being moved a short distance in either direction from said neutral position.

4. In a magazine type of camera and control means therefor, the combination of a camera casing, lens means in operative position thereon, means for mounting a film magazine in said casing so as to hold a film therein in operative relationship to said lens means, shutter means for controlling the exposure of the film, means for advancing the film step by step in timed relation to the operative movements of the shutter means, and means comprising an adjustable member adapted in one position to hold the camera out of operation, and adapted when the member is moved to a changed position automatically to cause the film-advancing means to run continuously so long as the member is held manually in said changed position, and adapted when the member is moved still farther in the same direction to a third position automatically to hold the member in such third position and to cause the film-advancing means to run continuously so long as the member remains in said third position, an arm adapted to swing with said adjustable member, and a spring-pressed arm having an obliquely positioned face portion adapted by engagement with a side face portion of said first-named arm to return said member from said second position to said one position and adapted by engagement with the end face portion of said first-named arm to be held out of operative pressure relationship thereto so as to have no turning effect thereon.

5. In a magazine type of camera and control means therefor, the combination of a camera casing, lens means in operative position thereon, means for mounting a film magazine in said casing so as to hold a film therein in operative relationship to said lens means, shutter means for controlling the exposure of the film, means for advancing the film step by step in timed relation to the operative movements of the shutter means, and means comprising an adjustable member adapted in one position to hold the camera out of operation and adapted when the member is moved to a changed position automatically to actuate the film-advancing means and the shutter for giving the film a single frame movement and exposure, and adapted when the member is moved from said one position in the opposite direction to a third position automatically to actuate the film-advancing means so long as the member is held manually in said third position, and adapted when the member is moved still farther in said opposite direction to a fourth position automatically to actuate the film-advancing means so long as the member remains in said fourth position, a plate adapted to swing with said adjustable member and having a V-shaped notch therein, and a spring-pressed arm having a wedge-shaped head portion adapted by engagement with said notch to return said member to said one position from either said second position or said third position and adapted by engagement with the end portion of said plate to be held out of operative pressure relationship to the plate so as to have no turning effect thereon when said member stands in said fourth position.

6. In a magazine type of camera and control means therefor, the combination of a camera casing, lens means in operative position thereon, means for mounting a film magazine in said casing so as to hold the film therein in operative relationship to said lens means, a shaft rotatably mounted in said casing, means for driving said shaft, shutter means connected with said shaft so as to be driven thereby for controlling the exposure of the film, means driven by said shaft for advancing the film step by step in timed relation to the operative movements of the shutter means, and means for controlling the rotation of said shaft comprising a plate rotatably mounted adjacent to said shaft and having two lugs thereon one longer than the other and in circumferentially spaced relation to each other, an arm fixedly mounted on said shaft in position to engage one of said lugs for holding the shaft from rotation when said plate is in its normal neutral position, and a bearing on said shaft adjacent to said arm in position to engage the other of said lugs for stopping the rotation of the shaft after a single complete revolution when the plate is moved slightly from said neutral position.

7. In a magazine type of camera and control means therefor, the combination of a camera casing, lens means in operative position thereon, means for mounting a film magazine in said casing so as to hold the film therein in operative relationship to said lens means, a shaft rotatably mounted in said casing, means for driving said shaft, shutter means connected with said shaft so as to be driven thereby for controlling the exposure of the film, means driven by said shaft for advancing the film step by step in timed relation to the operative movements of the shutter means, and means for controlling the rotation of said shaft comprising a plate rotatably mounted adjacent to said shaft and having two lugs thereon one longer than the other and in circumferentially spaced relation to each other, an arm fixedly mounted on said shaft in position to engage one of said lugs for holding the shaft from rotation when said plate is in its normal neutral position, a bearing on said shaft adjacent to said arm in position to engage the other of said lugs for stopping the rotation of the shaft after a single complete revolution when the plate is moved slightly from said neutral position, and means comprising a spring adapted normally to hold said arm yieldingly in its neutral position.

8. In a camera of the film magazine type, the combination of a casing providing a magazine chamber, a shaft extending forwardly in said chamber, a shutter at the front portion of said chamber connected with said shaft so as to be driven thereby, means for driving said shaft, and means for controlling the rotation of said shaft, comprising a second shaft rotatably mounted in position adjacent to said first-named shaft, a lug on said second shaft, stop means on said first-named shaft adapted when the second shaft is in a predetermined neutral position to engage said lug so as to hold said first-named shaft from rotation and adapted when said second shaft is rotated slightly in either direction from said neutral position to clear said lug for permitting rotation of said first-named shaft, and means adapted normally to hold said second shaft yieldingly in its neutral position.

9. In a camera of the film magazine type, the combination of a casing providing a magazine chamber, a shaft extending forwardly in said chamber, a shutter at the front portion of said chamber connected with said shaft so as to be driven thereby, means for driving said shaft, and means for controlling the rotation of said shaft, comprising a second shaft rotatably mounted in position adjacent to said first-named shaft, a lug on said second shaft, stop means on said first-named shaft adapted when the second shaft is in a predetermined neutral position to engage said lug so as to hold said first-named shaft from rotation and adapted when said second shaft is rotated slightly in either direction from said neutral position to clear said lug for permitting rotation of said first-named shaft, a plate on said second shaft having a notch therein, and a spring-pressed arm having a cam portion thereon adapted by engagement with said notch normally to move said second shaft into its neutral position when the shaft is released in slightly angled displacement from said neutral position.

10. In a camera of the film magazine type, the combination of a casing providing a magazine chamber, a shaft extending forwardly in said chamber, a shutter at the front portion of said chamber connected with said shaft so as to be driven thereby, means for driving said shaft, and means for controlling the rotation of said shaft, comprising a second shaft rotatably mounted in position adjacent to said first-named shaft, a lug on said second shaft, stop means on said first-named shaft adapted when the second shaft is in a predetermined neutral position to engage said lug so as to hold said first-named shaft from rotation and adapted when said second shaft is rotated slightly in either direction from said neutrol position to clear said lug for permitting rotation of said first-named shaft, means adapted when said second shaft has been displaced angularly in one direction from its neutral position for stopping the rotation of said second shaft at the end of a predetermined amount of rotation, and means adapted normally to return said second shaft to its neutral position when said second shaft is released after such predetermined rotation.

11. In a camera of the film magazine type, the combination of a casing providing a magazine chamber, a shaft extending forwardly in said chamber, a shutter at the front portion of said chamber connected with said shaft so as to be driven thereby, means for driving said shaft, and means for controlling the rotation of said shaft, comprising a second shaft rotatably mounted in position adjacent to said first-named shaft, a lug on said second shaft, stop means on said first-named shaft adapted when the second shaft is in a predetermined neutral position to engage said lug so as to hold said first-named shaft from rotation and adapted when said second shaft is rotated slightly in either direction from said neutral position to clear said lug for permitting rotation of said first-named shaft, a second lug on said first-named shaft in spaced angular relationship to said first-named lug, other stop means on said first-named shaft adapted to engage said second lug when said second shaft has been displaced angularly in one direction from its neutral position for stopping the rotation of said second shaft at about the end of a single complete revolution, and means adapted normally to return said second shaft to its neutral position when said second shaft is released after such single complete revolution.

12. In a camera of the film magazine type, the combination of a casing providing a magazine chamber, a shaft extending forwardly in said chamber, a shutter at the front portion of said chamber connected with said shaft so as to be driven thereby, means for driving said shaft, and means for controlling the rotation of said shaft, comprising a second shaft rotatably mounted in position adjacent to said first-named shaft, a lug on said second shaft, stop means on said first-named shaft adapted when the second shaft is in a predetermined neutral position to engage said lug so as to hold said first-named shaft from rotation, the arrangement being such that when said second shaft is given a slight rotary movement in one direction from said neutral position said first-named shaft is free to rotate continuously, and means adapted normally to return said second shaft to its neutral position when said second shaft is released after a rotary movement of said first-named shaft.

13. In a camera of the film magazine type, the combination of a casing providing a magazine chamber, a shaft extending forwardly in said chamber, a shutter at the front portion of said chamber connected with said shaft so as to be driven thereby, means for driving said shaft, and means for controlling the rotation of said shaft, comprising a second shaft rotatably mounted in position adjacent to said first-named shaft, a lug on said second shaft, stop means on said first-named shaft adapted when the second shaft is in a predetermined neutral position to engage said lug so as to hold said first-named shaft from rotation, the arrangement being such that when said second shaft is given a slight rotary movement in one direction from said neutral position said first-named shaft is free to rotate continuously, means adapted normally to return said second shaft to its neutral position when said second shaft is released after a rotary movement of said first-named shaft, and means adapted when said second shaft is given a slight additional rotary movement in the same direction from said neutral position to hold out of operation the means by which said second shaft normally is returned to neutral position.

14. In a camera of the film magazine type, the combination of a casing providing a magazine chamber, a shaft extending forwardly in said chamber, a shutter at the front portion of said chamber connected with said shaft so as to be driven thereby, means for driving said shaft, and means for controlling the rotation of said shaft, comprising a second shaft rotatably mounted in position adjacent to said first-named shaft, a lug on said second shaft, stop means on said first-named shaft adapted when the second shaft is in a predetermined neutral position to engage said lug so as to hold said first-named shaft from rotation, the arrangement being such that when said second shaft is given a slight rotary movement in one direction from said neutral position said first-named shaft is free to rotate continuously, a plate on said second shaft having a notch therein, and a spring-pressed arm having a cam portion thereon adapted by pressure on said notch normally to move said second shaft into its neutral position when the shaft is released in slightly angled displacement from said neutral position, said plate being adapted by engagement with the cam portion of said arm when said second shaft has been given a slight additional rotary movement in the same direction from said neutral position to hold said arm out of effective pressure relationship with said plate so as to prevent return movement of said second shaft by said arm.

PHILMORE F. SPERRY.